United States Patent [19]
Bois et al.

[11] 4,388,574
[45] Jun. 14, 1983

[54] CONTROL CIRCUIT FOR VARIABLE-SPEED WINDSHIELD WIPER

[75] Inventors: Wilhelm Bois, Gaimersheim; Josef Büchl, Lenting, both of Fed. Rep. of Germany

[73] Assignee: Audi NSU Auto Union AG, Neckarsulm, Fed. Rep. of Germany

[21] Appl. No.: 259,095

[22] Filed: Apr. 30, 1981

[30] Foreign Application Priority Data

May 10, 1980 [DE] Fed. Rep. of Germany ....... 3017982

[51] Int. Cl.³ .............................................. H02P 1/04
[52] U.S. Cl. .................................... 318/443; 318/444
[58] Field of Search ................. 318/443, 444, DIG. 2; 15/250 C, 250.02, 250.12, 250.13

[56] References Cited

U.S. PATENT DOCUMENTS 3,919,613 11/1975 Steinmann .................... 318/DIG. 2

FOREIGN PATENT DOCUMENTS 2642247 3/1978 Fed. Rep. of Germany ..... 318/DIG. 2
2649413 5/1978 Fed. Rep. of Germany ..... 318/DIG. 2
2854156 6/1980 Fed. Rep. of Germany ...... 318/443

*Primary Examiner*—Ulysses Weldon
*Attorney, Agent, or Firm*—Karl F. Ross; Herbert Dubno

[57] ABSTRACT

A windshield wiper is operated by a wiper motor from an electric source, with a control circuit operating the motor. This control circuit has a continuous-wipe switch which when closed operates the wiper continuously. A discontinuous-wipe switch can be closed to start an oscillator, with this oscillator connected to a backward counter which counts backwardly synchronously with the oscillator. A comparator compares the instantaneous numerical output of the counter with a fixed numerical output generated by a settable memory, and operates the wiper briefly when the two outputs agree. A set switch is connected to the memory and can reset it so that when this set switch is operated the fixed numerical output of the memory is fixed at the instantaneous numerical output of the counter, thereby setting the interval between successive wipes of the wiper. This set switch may also operated the windshield washer, with appropriate circuits being used so that a short actuation of the set switch resets the memory but a long actuation operates the windshield washer.

10 Claims, 1 Drawing Figure

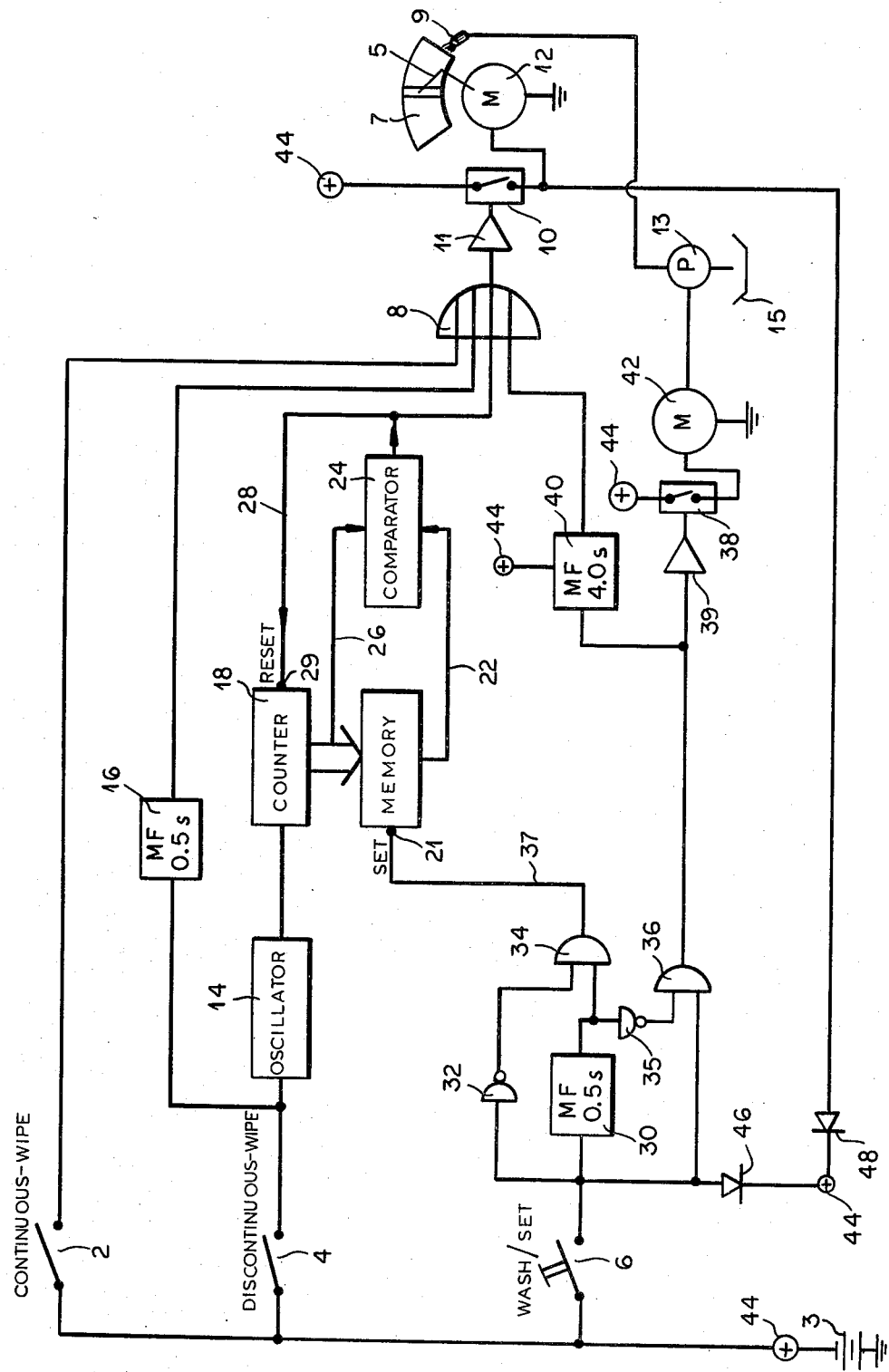

CONTROL CIRCUIT FOR VARIABLE-SPEED WINDSHIELD WIPER

FIELD OF THE INVENTION

The present invention relates to a control circuit for a variable-speed windshield wiper. More particularly this invention concerns an electronic system which allows the wipe rate of a vehicular windshield wiper to be adjusted.

BACKGROUND OF THE INVENTION

It is known, as for example from U.S. Pat. No. 3,351,836, to power a windshield-wiper motor from an oscillator having an RC circuit that can be adjusted to vary the period of the oscillator. Normally the resistance element is either made variable, or any of several different resistances can be switched in to vary the speed. Such an arrangement has the advantage of extreme simplicity, yet rarely offers a wide variation in wipe rate. Furthermore the provision of a potentiometer to achieve stepless variation has been found disadvantageous in that such circuit elements frequently have a limited service life, especially in the normally harsh environment of a motor vehicle.

Accordingly a system has been proposed in the German-language publication *Elektor* (April 1980, pages 34–39) to use a wholly electronic arrangement which is controlled by a single switch in a rather complicated manner. If the switch is actuated after the ignition is turned on the wipers operate continuously at maximum speed. If the switch is turned off, a counter in the control circuit begins to count out the interval during which a memory of the circuit is fed "0" pulses from the counter. As soon as the switch is again actuated, a "1" pulse is fed into the memory. This "1" pulse triggers the wiper which makes one sweep back and forth over the windshield and at the same time restarts the counter at zero. Once again the counter generates a series of "0" pulses which are monitored by the memory until the previously read in "1" pulse reappears, at which time the wiper is again actuated. Thus the time interval between the two actuations of the switch constitutes the time interval between subsequent successive wipes of the windshield.

Such an arrangement is interesting in that it does allow the user to exactly program the windshield wipers. The circuit itself is relatively complex and is energized, that is connected to the vehicular electrical system, at all times so that it represents quite an energy drain. Furthermore it is relatively difficult to combine such complicated circuitry with a simultaneous wash-and-wipe function.

OBJECTS OF THE INVENTION

It is therefore an object of the present invention to provide an improved control circuit for a vehicular windshield wiper that is operated by an electric motor in turn powered from an electric source such as the vehicle battery.

Another object is to provide such a system which uses substantially less electrical energy than the prior-art systems.

Yet another object is the provision of an improved system which is easy to program and which can easily be combined with a wipe-and-wash function.

SUMMARY OF THE INVENTION

These objects are attained according to the instant invention in a control circuit having a continuous-wipe switch which is connected between the vehicle electricity source and the motor for the windshield wiper and which is closable to operated the wiper continuously. A discontinuous-wipe switch has one side connected to the electricity source and another side connected to an oscillator which therefore is powerable through this discontinuous-wipe switch to oscillate. A resettable counter is connected to the oscillator for counting synchronously as the oscillator oscillates and for generating a correspondingly changing numerical output, normally one that counts down once from a predetermined high starting number with each oscillation. A settable memory is connected to the counter and normally generates a fixed numerical output. A circuit normally incorporating a comparator receives the outputs from the counter and memory and is connected to the reset terminal of the counter and to the motor for the wiper. When the two inputs are the same, that is both numbers are the same, the comparator generates an output that resets the counter to start counting again at its high starting number and that momentarily energizes the wiper motor for a single sweep of the windshield. A set switch is connected to the memory and can be actuated to set or establish in the memory as its fixed numerical output the number currently being generated by the counter.

Thus with the system according to the instant invention the user need merely turn on the discontinuous-wipe switch and then, when the amount of time has elasped that he or she wants between successive wipes of the windshield, he or she simply operates the set button to lock in the selected interval. The system is not constantly operating and consuming electricity, as the subcircuit comprised of the oscillator, counter, memory, and comparator is only connected up when the discontinous-wipe function is being used. What is more the simple use of a set button, which can in fact be a different style of movement for the discontinuous-wipe switch, makes programming the device quite simple.

According to another features of this invention the discontinuous-wipe switch also is connected to a single-pulse generator, or a so-called monoflop. Thus when the discontinuous-wipe switch is thrown on the wiper immediately gives at least one wipe, therefore clearly making apparent to the user the starting point for the wiper cycle.

The counter according to this invention has a reset terminal which is connected to the output of a comparator forming part of the circuit means. This comparator has inputs connected to the memory and to the counter for receiving the respective outputs and generates on its output, which is also connected to the wiper motor, a pulse when the numbers fed it from the counter and memory are the same. Thus when the number being generated by the counter is the same as the fixed set number being generated by the memory, the comparator gives an output that on the one hand resets the counter so that it starts counting all over again from the top, and on the other hand briefly operates the wiper. The circuit therefore is relatively simple, yet operates in a manner easy to understand and use.

According to another feature of this invention the set switch can be actuated in two different manners. Such an arrangement can be ideally combined with a windshield washer arrangement having a sprayer directed at the windshield that is swept by the wiper, a pump connected to a liquid reservoir for spraying liquid on the windshield, and second circuit means connected between the pump, set switch, and wiper motor for actuating both the wiper motor and pump when the set switch is actuated in a manner different from its actuation manner for setting the memory.

This is achieved according to the present invention by connecting the memory reset terminal to the output of a first AND gate and the pump-actuation relay and amplifier to the output of a second AND gate. One of these AND gates has its one input connected via an inverter directly to the set switch and its other input connected directly to the output of a second single-pulse generator whose input in turn is connected to the set switch. The other of these AND gates has its one input connected directly to the set switch and its other input connected via an inverter to the output of the second single-pulse generator. Thus if the set switch is actuated for a time shorter than the time constant of the monoflop serving as the second single-pulse generator, the one AND gate will receive two inputs simultaneously and will feed a pulse or signal to the respective memory or relay. If the time constant is very short, on the order of 0.5 sec, a tapping or momentary closing of the set switch will operate the one AND gate and a longer actuation of holding closed of the set switch will operate the other AND gate.

According to another feature of this invention the second circuit means includes a respective third single-pulse generator or monoflop connected between the respective AND gate and the wiper motor and having a relatively long time constant. Thus when the set switch is actuated in the manner to wash the windshield, the wiper will be operated for a while as the pump sprays.

DESCRIPTION OF THE DRAWING

The sole FIGURE of the drawing is a circuit diagram of the system according to the instant invention.

SPECIFIC DESCRIPTION

As seen in the drawing the wiper-control system according to the instant invention has only three controls, a continuous-wipe switch 2 of the maintain type, a discontinuous-wipe or pulse switch 4 also of the maintain type, and a momentary-contact wash/set switch 6 all connected on one side to the hot plus terminal 44 of a vehicle battery 3 whose other terminal is grounded. A windshield wiper 5 is operated by a motor 12 in turn energized through a relay 10 from the hot terminal 44. In addition a spray nozzle 9 directed at the windshield 7 is connected to a pump 13 driven by a motor 42 and capable of drawing wash liquid from a reservoir 15 and spraying it on the windshield 7.

A four-input OR gate 8 has one of its inputs connected to the continuous-wipe switch 2 and its output connected through an amplifier 11 to the relay 10 that controls the motor 12. This motor 12 is wired up in the standard manner so that it can only stop when the wiper 5 is in one end position. Thus when the wiper is turned off it will not stand up and block the view through the windshield 7.

The discontinuous-wipe switch 4 is connected through a standard monoflop 16 having a time constant of 0.5 sec to another input of the OR gate 8. Closing this switch 4 will therefore immediately feed a pulse for 0.5 sec to the OR gate 8 to operate the wiper 5 for this time.

In addition this switch 4 is connected to an oscillator 14 of the Schmitt trigger type whose output in turn is connected to the input of a resettable counter 18 having a reset terminal 29 and also having outputs 26 connected both to a settable memory and to a comparator 24. The output of this memory in turn is connected via a line 22 to the other input of this comparator 24 whose output is connected both to one of the inputs of the OR gate 8 and via a reset line 28 to the reset terminal 29 of the counter 18. The counter 18, memory, and comparator 24 are all integrated circuits and may respectively be of the type sold as Motorola MC 14029, MC 14174, and MC 14585.

The wash/set switch 6 is connected via a monoflop 30 having a time constant of 0.5 sec and via an inverter 32 to the two inputs of an AND gate 34 whose sole output is connected via a set line 37 to the set terminal 21 of the memory. Thus if the switch 6 is actuated for less than 0.5 sec a pulse will be fed through the line 37 to the memory 20 to set it. More specifically an actuation for, say, 0.3 sec of the switch 6 will create a pulse for 0.5 sec at the output of the monoflop 30, while after the 0.3 sec energization of the input of the inverter 32 stops this element will generate an output.

The switch 6 is also connected to one of two inputs of another AND gate 36 whose other input is connected via an inverter 35 to the output of the monoflop 30. The output of this AND gate in its turn is connected via an amplifier 39 and a relay 38 to a pump motor 42 and via a monoflop 40 having a time constant of 3.0 sec—5.0 sec to the last input of the OR gate 8 that controls the wiper motor 12. The monoflop 30 and wiper motor 12 are energized via respective diodes 46 and 48 directly from a voltage source which may be the hot terminal 44. The motor 42, which when energized pumps liquid from the supply reservoir 15 and sprays it on the windshield 7, is similarly connected directly to the voltage source 44.

The arrangement described above operates as follows:

When the continuous-wipe switch 2 is closed the motor 12 will be energized continuously and will therefore sweep the wiper 5 across the windshield 7 at maximum speed.

If only the discontinuous-wipe switch 4 is closed the wiper 5 will first operate for 0.5 sec and then stop. Simultaneously with closing of the switch 4, however, the oscillator 14 will start feeding pulses to the counter 18 which will start to count backward from a predetermined high number. Meanwhile the memory is at zero and is indeed feeding this number to the one input of the comparator 24. When the output 26 of the counter 18 is also at zero, after the counter has counted back all the way to zero, the comparator 24 will generate a pulse. This pulse will simultaneously reset the counter 18 at its starting number, and will energize the respective input of the OR gate 8 long enough for the wiper 5 to sweep back and forth over the windshield 7 once. Normally this time span is set to be quite long, about 30 sec, so that if the discontinuous-wipe switch 4 is operated and nothing else is done the wiper will operate once about every 30 sec.

If the discontinuous-wipe switch 4 is closed and then, after less than the 30 sec it takes the whole subcircuit formed by the oscillator 14, counter 18, memory 20, and comparator 24 to cycle, the wash-set switch 6 is tapped so that it is closed for less than 0.5 sec, the rate of intermittent operation of the wiper 5 can be changed. Thus the driver closes the switch 4 and after, say, 10 sec, he or she taps the switch 6.

As described above such momentary actuation of the switch 6 will create a pulse at the output of the AND gate 34 which will set the fixed numerical output of the memory at the number the counter 18 has counted down to at the time the switch 6 is tapped. The memory output on line 22 therefore agrees with the counter output on line 26 so that the comparator 24 generates a pulse to operate the wiper 5 and restart the counter 18. From then on each time the counter 18 counts down to the number set in the memory, the wiper 5 will be operated and the counter 18 reset. The operator has therefore programmed the wiper to operate at the time interval between when he or she closed the switch 4 and when he or she tapped the switch 6. Thereafter it is possible to further shorten this period by simply tapping the switch again at an interval after an operation of the wiper 5 that is smaller than its programmed operation cycle. To lengthen the period it is necessary to open the switch 4 to reprogram the device. Such reopening automatically resets the memory 20 to zero and stops the counter 18, so that when the counter 18 restarts it will start at its highest number.

The monoflop 16 therefore serves the sole function of providing the user with an indication that the switch 4 has been actuated, as otherwise this circuit element takes no part in the operation of the system according to this invention. It serves merely to operate the wiper 5 a first time when the switch 4 is closed.

In order to wash the windshield the wash/set switch 6 is held down for more than 0.5 sec. After such an actuation lasting more than 0.5 sec the monoflop 30 ceases to generate its output so that the inverter connected between this monoflop 30 and the AND gate 36 feeds a signal to its input of this AND gate 36. Since the switch 6 is still closed, both inputs of the AND gate 36 therefore will be energized so that in turn its output will generate a pulse for as long as the switch 6 is held closed. This pulse at the output of the AND gate 36 will be effective through the amplifier 39 and relay 38 to operate the pump 42 and spray some wash liquid on the windshield 7, and to start the monoflop 4 to feed a pulse lasting some 4 sec to its input of the OR gate 8 for operation of the windshield wiper 5 for some 4 sec.

If the wash/set button 6 is held closed while the switch 2 is closed the only result will be a spraying of the windshield for the time the switch 6 is closed, minus 0.5 sec. If it is pushed and held closed while the discontinuos-wipe switch 4 is closed, it will spray the windshield and wipe it briefly, regardless of where the discontinuous-wipe subcircuit is in its cycle. If it is pressed when neither of the switches 2 or 4 is closed, the windshield will be briefly sprayed and wiped only.

Thus the system according to the instant invention has three simple switches which allow it to be programmed with ease and otherwise set up to do all the functions of even the most sophisticated of the prior-art systems. What is more the various circuit elements are energized only when the system is carrying out their particular functions, except of course when they are in the middle of a cycle which they will finish before shutting down.

We claim:

1. In combination with a windshield wiper operated by a motor powered in turn from an electric source, a control circuit comprising:

continuous-wipe switch means connected between said source and said motor and closable for continuous operation of said wiper by said motor;
    a discontinuous-wipe switch having a first side connected to said source and a second side;
    an oscillator connected to the second side of said discontinuous-wipe switch and powerable therethrough by said source to oscillate;
    resettable counter means connected to said oscillator for counting synchronously as same oscillates and for generating a correspondingly changing numerical output;
    a settable memory connected to said counter means for generating a fixed numerical output;
    circuit means connected between said memory, said motor, and said counter means for energizing said motor and resetting said counter means when said numerical outputs are equal to each other; and
    means including a set switch operable to establish in said memory as said fixed numerical output the numerical output of said counter generally at the instant when said set switch is operated.

2. The control circuit defined in claim 1, further comprising means connected to said motor and to said discontinuous-wipe switch for generating a single short pulse when said discontinuous-wipe switch is actuated and for operating said motor briefly with said pulse, whereby said wiper will be operated briefly when said discontinuous-wipe switch is actuated.

3. The control circuit defined in claim 2 wherein said counter means has a reset terminal, said circuit means including a comparator having inputs respectively connected to said memory and counter means to receive the respective outputs thereof and an output connected both to said reset terminal of said counter means and to said electric motor.

4. The control circuit defined in claim 2 wherein said counter is a backward counter.

5. The circuit defined in claim 1 wherein said set switch can be actuated in two different manners, said memory only responding to one of said manners of actuation, said circuit further comprising:

a sprayer directed at the windshield;
    means including a pump and a liquid reservoir connected to said sprayer for spraying liquid on said windshield; and
    second circuit means connected to said pump, set switch, and motor for briefly actuating said pump and motor when said set switch is actuated in the other of said manners of actuation.

6. The circuit defined in claim 5 wherein the first-mentioned circuit means further includes a single-pulse generator having a relatively short time constant and connected between said set switch on one side and said memory and said second circuit means on the other.

7. The circuit defined in claim 6 wherein said first circuit means includes an inverter connected to said set switch and an AND gate having an output connected to said memory to reset same, one input connected to said single-pulse generator, and another input connected to said inverter and therethrough to said set switch, whereby operation of said set switch for a time shorter than said time constant is said one manner of actuation.

8. The circuit defined in claim 7 wherein said single-pulse generator is a monoflop.

9. The circuit defined in claim 7 wherein said second circuit means includes a second inverter connected to said single-pulse generator and a second AND gate having
 an output connected to said pump, one input of said second AND gate connected to said set switch, and another input of said second AND gate connected to the second inverter and therethrough to said single-pulse generator, whereby operation of said set switch for a time longer than said time constant is the other manner of actuation.

10. The circuit defined in claim 9 wherein said second circuit means includes a second single-pulse generator having a relatively long time constant and connected between said output of said other AND gate and said motor of said wiper.

* * * * *